(12) United States Patent
Lee et al.

(10) Patent No.: US 12,498,486 B2
(45) Date of Patent: Dec. 16, 2025

(54) TOF SENSOR, IMAGE SENSING DEVICE AND OPERATION METHOD THEREOF

(71) Applicant: SK hynix Inc., Gyeonggi-do (KR)

(72) Inventors: Eun Chang Lee, Gyeonggi-do (KR); Min Seok Shin, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 1059 days.

(21) Appl. No.: 17/534,237

(22) Filed: Nov. 23, 2021

(65) Prior Publication Data

US 2022/0365218 A1    Nov. 17, 2022

(30) Foreign Application Priority Data

May 12, 2021    (KR) .................. 10-2021-0061453

(51) Int. Cl.
*G01C 3/08* (2006.01)
*G01S 17/26* (2020.01)
*G01S 17/894* (2020.01)

(52) U.S. Cl.
CPC ............ *G01S 17/894* (2020.01); *G01S 17/26* (2020.01)

(58) Field of Classification Search
CPC ............................. G01S 17/894; G01S 17/26
See application file for complete search history.

(56) References Cited

U.S. PATENT DOCUMENTS

| | | | |
|---|---|---|---|
| 2011/0292370 A1 | 12/2011 | Hills et al. | |
| 2021/0247500 A1* | 8/2021 | Dehlinger | G01S 17/10 |
| 2023/0305123 A1* | 9/2023 | Hurwitz | G01S 7/4918 |

FOREIGN PATENT DOCUMENTS

| | | | | |
|---|---|---|---|---|
| CN | 108712245 A | 10/2018 | | |
| CN | 110133671 A | 8/2019 | | |
| CN | 111602070 A | 8/2020 | | |
| CN | 112424640 A | 2/2021 | | |
| EP | 3210037 B * | 3/2020 | ............. | G01S 17/89 |
| KR | 10-2020-0117379 A | 10/2020 | | |
| WO | WO 20130100913 A1 * | 1/2013 | ............. | G01S 17/10 |

OTHER PUBLICATIONS

Chanik Park et al., A High Performance Controller for NAND Flash-based Solid State Disk (NSSD), 2006, 1-4244-0026-0/06, IEEE.

Office Action for Chinese Patent Application No. 202111635056.0 issued by the Chinese Patent Office on Jan. 20, 2025.

* cited by examiner

*Primary Examiner* — Mark Hellner
(74) *Attorney, Agent, or Firm* — IP & T GROUP LLP

(57) ABSTRACT

A Time of Flight (TOF) sensor using dual frequency includes: a light source for irradiating light to an external subject; a phase modulation controller for providing the light source with a clock so that the light source irradiates irradiation light according to a timing of a global clock, and generating a plurality of pixel clocks having dual frequency; and a pixel array for receiving the pixel clocks and generating a pixel signal, wherein the pixel clocks have a different number of phases according to different exposure frames at the dual frequency.

15 Claims, 5 Drawing Sheets

| Modulation frequency = 20MHz | | Modulation frequency = 100MHz | | | | Modulation frequency = 20MHz | | Modulation frequency = 100MHz | | | |
|---|---|---|---|---|---|---|---|---|---|---|---|
| clock A: 0 | clock A: π/2 | clock A: 0 | clock A: π/2 | clock A: π | clock A: 3π/2 | clock A: π | clock A: 3π/2 | clock A: 0 | clock A: π/2 | clock A: π | clock A: 3π/2 |
| clock B: π | clock B: 3π/2 | clock B: π | clock B: 3π/2 | clock B: 0 | clock B: π/2 | clock B: 0 | clock B: π/2 | clock B: π | clock B: 3π/2 | clock B: 0 | clock B: π/2 |

FIG. 2

| Modulation frequency = 20MHz | | Modulation frequency = 100MHz | | | | Modulation frequency = 20MHz | | Modulation frequency = 100MHz | | | |
|---|---|---|---|---|---|---|---|---|---|---|---|
| clock A: 0 clock B: π | clock A: π/2 clock B: 3π/2 | clock A: 0 clock B: π | clock A: π/2 clock B: 3π/2 | clock A: π clock B: 0 | clock A: 3π/2 clock B: π/2 | clock A: π clock B: 0 | clock A: 3π/2 clock B: π/2 | clock A: 0 clock B: π | clock A: π/2 clock B: 3π/2 | clock A: π clock B: 0 | clock A: 3π/2 clock B: π/2 |

TOF SENSOR, IMAGE SENSING DEVICE AND OPERATION METHOD THEREOF

CROSS-REFERENCE TO RELATED APPLICATIONS

The present application claims priority to Korean Patent Application No. 10-2021-0061453, filed on May 12, 2021, which is incorporated herein by reference in its entirety.

BACKGROUND

1. Field

Various embodiments of the present invention relate to semiconductor designing technology, and more particularly, to a Time of Flight (TOF) sensor using dual frequency, an image sensing device, and an operation method thereof.

2. Description of the Related Art

Recently, the paradigm for a computer environment is shifting into ubiquitous computing, which allows users to access computer systems anywhere and anytime. The paradigm shift rapidly increases the use of portable electronic devices, such as mobile phones, digital cameras, laptop computers and the like.

In particular, with the rapid development of imaging devices, the development for image photographing devices, such as cameras and camcorders equipped with image sensors, is accelerating. Since an image photographing device is not only capable of capturing images and recording them in a recording medium but also reproducing the images at any time, the number of users is increasing rapidly. This also gradually increases the users' demands for performance and functions, and high performance and multi-functionalization are being pursued along with miniaturization, light weight, and low power consumption.

Such an image photographing device may obtain distance information between an electronic device and an external object by irradiating light to the external object from a light source and converting the time taken for the reflected light from the external object to be received by an image sensor into distance. As such, the image photographing device may include a Time of Flight (TOF) sensor to obtain distance information for an external object.

Since TOF sensors have different accuracy and measurement range according to phase modulation frequency, a TOF sensor using dual frequency is used, but there is a problem in that the structure of a TOF sensor using dual frequency is complicated.

SUMMARY

Embodiments of the present invention are directed to a Time of Flight (TOF) sensor that provides a plurality of pixel clocks each having a different number of phases according to different exposure frames at a dual frequency, an image sensing device, and a method of driving the same.

Solutions for the technical problems to be achieved by the embodiments of the present invention are not limited to solutions for the technical problems mentioned above, and other solutions for technical problems not mentioned above may also be clearly understood by those of ordinary skill in the art to which the present invention pertains from the description below.

In accordance with an embodiment of the present invention, a Time of Flight (TOF) sensor using dual frequency may include a light source suitable for irradiating light to an external subject; a phase modulation controller suitable for providing the light source with a clock so that the light source irradiates the light according to a timing of a global clock and generating a plurality of pixel clocks having dual frequency; and a pixel array suitable for receiving the pixel clocks and generating a pixel signal, wherein each of the pixel clocks has a different number of phases according to different exposure frames at the dual frequency.

The dual frequency may have a high frequency and a low frequency less than the high frequency.

The phase modulation controller may be further suitable for performing, at the high frequency, a modulation operation in which the pixel clocks are shifted by 90 degrees for each of the pixel clocks to have four phases.

The phase modulation controller may perform, at the high frequency, the modulation operation in which a first pixel clock of the pixel clocks is shifted by 90 degrees for the first pixel clock to sequentially have phases of 0, $\pi/2$, $\pi$, and $3\pi/2$, and a second pixel clock of the pixel clocks is shifted by 90 degrees for the second pixel clock to sequentially have phases of $\pi$, $3\pi/2$, 0, and $\pi/2$.

The phase modulation controller may be further suitable for performing, at the low frequency, a modulation operation in which the pixel clocks having opposite phases to each other are shifted by 90 degrees for each of the pixel clocks to have two phases.

The phase modulation controller may perform, at the low frequency, the modulation operation in which a first pixel clock of the pixel clocks is shifted by 90 degrees for the first pixel clock to sequentially have phases of 0 and $\pi/2$ in a current period of the first pixel clock, a second pixel clock of the pixel clocks is shifted by 90 degrees for the second pixel clock to sequentially have phases of $\pi$ and $3\pi/2$ in a current period of the second pixel clock, the first pixel clock is shifted by 90 degrees for the first pixel clock to sequentially have phases of $\pi$ and $3\pi/2$ in a subsequent period of the first pixel clock, and the second pixel clock is shifted by 90 degrees for the second pixel clock to sequentially have phases of 0 and $\pi/2$ in a subsequent period of the second pixel clock.

The pixel clocks may have opposite phases to each other.

The high frequency may be 100 MHz or higher, and the low frequency may be less than 100 MHz.

In accordance with another embodiment of the present invention, an image sensing device may include a Time of Flight (TOF) sensor suitable for generating a pixel signal according to a plurality of pixel clocks having dual frequency, wherein each of the pixel clocks has a different number of phases according to different exposure frames at the dual frequency; a memory suitable for storing offset values for the dual frequency; and a processor suitable for activating the TOF sensor in response to an input to measure a distance to an external subject, measuring the distance to the external subject by using the activated TOF sensor, and storing the measured distance in the memory.

The TOF sensor may include a light source suitable for irradiating and receiving light to and from the external subject; a phase modulation controller suitable for providing a clock to the light source so that the light source irradiates the light according to a timing of a global clock and generating the plurality of pixel clocks having the dual frequency; and a pixel array suitable for receiving the pixel clocks and generating pixel signals.

The dual frequency may have a high frequency and a low frequency less than the high frequency.

The phase modulation controller may be further suitable for performing, at the high frequency, a modulation operation in which the pixel clocks are shifted by 90 degrees for each of the pixel clocks to have four phases.

The phase modulation controller may perform, at the high frequency, the modulation operation in which a first pixel clock of the pixel clocks is shifted by 90 degrees for the first pixel clock to sequentially have phases of 0, π/2, π, and 3π/2, and a second pixel clock of the pixel clocks is shifted by 90 degrees for the second pixel clock to sequentially have phases of π, 3π/2, 0, and π/2.

The phase modulation controller may be further suitable for performing, at the low frequency, a modulation operation in which the pixel clocks having opposite phases to each other are shifted by 90 degrees for each of the pixel clocks to have two phases.

The phase modulation controller may perform, at the low frequency, the modulation operation in which a first pixel clock of the pixel clocks is shifted by 90 degrees for the first pixel clock to sequentially have phases of 0 and π/2 in a current period of the first pixel clock, a second pixel clock of the pixel clocks is shifted by 90 degrees for the second pixel clock to sequentially have phases of π and 3π/2 in a current period of the second pixel clock, the first pixel clock is shifted by 90 degrees for the first pixel clock to sequentially have phases of π and 3π/2 in a subsequent period of the first pixel clock, and the second pixel clock is shifted by 90 degrees for the second pixel clock to sequentially have phases of 0 and π/2 in a subsequent period of the second pixel clock.

The pixel clocks may have opposite phases to each other.

The high frequency may be 100 MHz or higher, and the low frequency may be less than 100 MHz.

In another embodiment of the present invention, a Time of Flight (TOF) sensor may include a clock generator suitable for generating first and second clocks; and a pixel array suitable for generating a pixel signal, which represents a distance to an object, based on the first and second clocks, wherein respective phases of the first and second clocks are opposite to each other, wherein each of the first and second clocks has 4 number of phases within a period thereof at a frequency of 100 MHz or higher, and wherein each of the first and second clocks has 2 number of phases within the period at a frequency under 100 MHz.

BRIEF DESCRIPTION OF THE DRAWINGS

FIG. 2 illustrates a plurality of pixel clocks each having a different number of phases according to a different exposure frame shown in FIG. 1 in accordance with an embodiment of the present invention.

DETAILED DESCRIPTION

Figure 1:
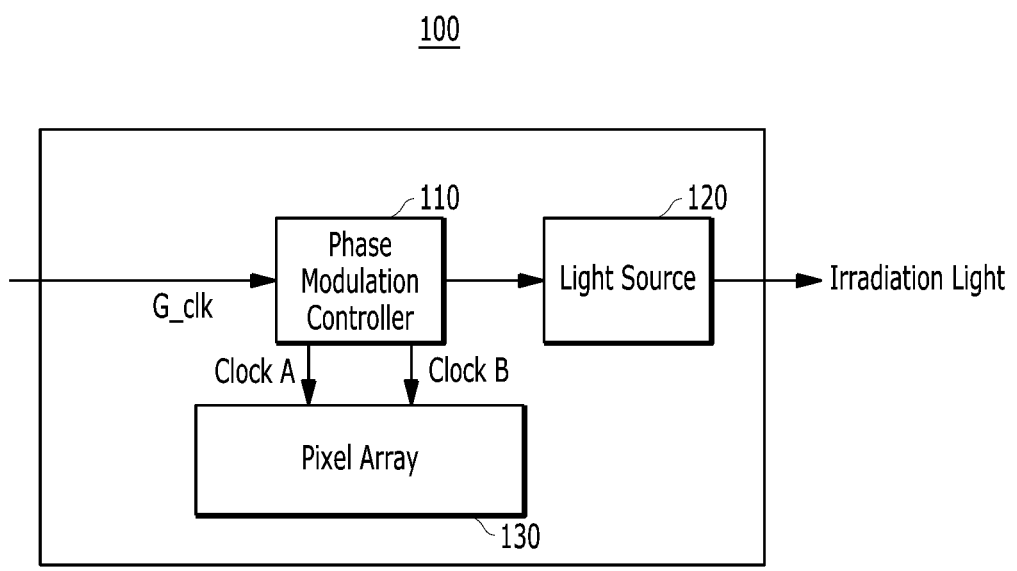
FIG. 1 is a block diagram illustrating a Time of Flight (TOF) sensor using dual frequency in accordance with an embodiment of the present invention.

Various embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

It will be understood that when an element is referred to as being "coupled" or "connected" to another element, it may mean that the two are directly coupled or electrically connected to each other with another circuit intervening therebetween. In the present disclosure, the singular forms are intended to include the plural forms as well, unless the context clearly indicates otherwise.

Figure 3:
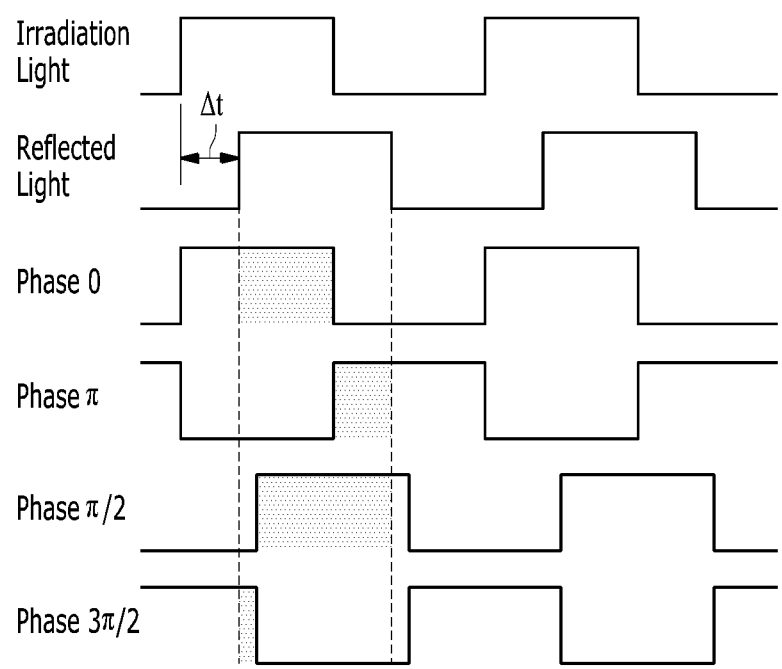
FIG. 3 is a waveform diagram illustrating a light source and waveforms of a plurality of pixel clocks shown in FIG. 1 in accordance with an embodiment of the present invention.

Hereinafter, a Time of Flight (TOF) sensor using dual frequency in accordance with an embodiment of the present invention will be described with reference to FIGS. 1 to 3. FIG. 1 is a block diagram illustrating a ToF sensor using dual frequency in accordance with an embodiment of the present invention. FIG. 2 illustrates a plurality of pixel clocks each having a different number of phases according to different exposure frames shown in FIG. 1 in accordance with an embodiment of the present invention. FIG. 3 is a waveform diagram illustrating a light source and waveforms of a plurality of pixel clocks shown in FIG. 1 in accordance with an embodiment of the present invention.

The TOF sensor 100 using dual frequency shown in FIG. 1 may include a phase modulation controller 110, a light source 120, and a pixel array 130.

The light source 120 may irradiate light to an external subject.

The phase modulation controller 110 may provide the light source 120 with a clock so that the light source 120 irradiates the light according to a global clock G_clk and may generate a plurality of pixel clocks Clock A and Clock B having dual frequency.

Herein, each of the first and second pixel clocks Clock A and Clock B may have a different number of phases according to different exposure frames at the dual frequency. The dual frequency may have a high frequency having a relatively high frequency and a low frequency having a relatively low frequency. For example, the first pixel clock Clock A may have 4 number of phases (i.e., the phases of 0, π/2, π, and 3π/2) within a single period of the first pixel clock Clock A when it has the high frequency while having 2 number of phases (i.e., the phases of 0 and π/2) within the single period of the first pixel clock Clock A when it has the low frequency. That is, the first and second pixel clocks Clock A and Clock B are shifted in every two exposures frames at the low frequency, and are shifted in every one exposure frame at the high frequency. In an embodiment of the present invention, the high frequency may be 100 MHz or higher and the low frequency may be less than 100 MHz. In an embodiment, the low frequency may be 20 MHz.

In particular, the phase modulation controller 110 may perform, at the high frequency, a modulation operation by which the first and second pixel clocks Clock A and Clock B are shifted by 90 degrees to have four phases 0, π/2, π, and 3π/2 within a single period of the first and second pixel clocks Clock A and Clock B. Herein, the first and second pixel clocks Clock A and Clock B may have opposite phases to each other.

That is, the first pixel clock Clock A may be shifted by 90 degrees to sequentially have four phases 0, π/2, π, and 3π/2 within the single period, and the second pixel clock Clock B may be shifted by 90 degrees to sequentially have four phases π, 3π/2, 0, and π/2 within the single period, at the high frequency. That is, the first and second pixel clocks Clock A and Clock B may be shifted in every single exposure frame at the high frequency.

Also, the phase modulation controller 110 may perform, at the low frequency, a modulation operation by which the pixel clocks Clock A and Clock B are shifted by 90 degrees to have two phases 0 and π/2 within the single period. The pixel clocks Clock A and Clock B may have opposite phases to each other.

The first pixel clock Clock A may be shifted by 90 degrees to sequentially have two phases 0 and π/2 within the single period, and the second pixel clock Clock B is shifted by 90 degrees to sequentially have two phases n and 3π/2 within the single period, at the low frequency. That is, the first and second pixel clocks Clock A and Clock B may be shifted in every two exposure frames at the low frequency.

Subsequently, in the next period, the first pixel clock Clock A may be shifted by 90 degrees to sequentially have two phases n and 3π/2, and the second pixel clock Clock B may be shifted by 90 degrees to sequentially have two phases 0 and π/2, at the low frequency. Thereafter, the above-described procedure may be repeatedly performed.

The pixel array 130 may receive reflected light from a subject and generate pixel signals according to the plurality of pixel clocks Clock A and Clock B.

Herein, Δt shown in FIG. 3 may represent a time difference between irradiation time of the irradiation light 371 and reception time of the reflected light 375, which will be described with reference to FIG. 4.

Hereinafter, an image sensing device in accordance with an embodiment of the present invention will be described with reference to FIG. 4, which is a block diagram illustrating an image sensing device 300 in accordance with an embodiment of the present invention.

Figure 4:
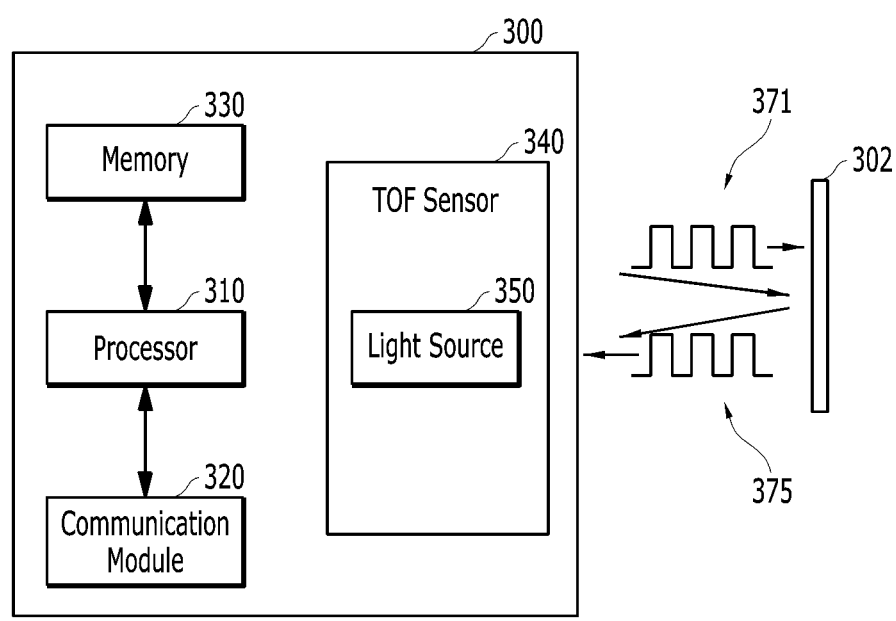
FIG. 4 is a block diagram illustrating an image sensing device in accordance with an embodiment of the present invention.

Referring to FIG. 4, the image sensing device 300 may include a processor 310, a memory 330, and a TOF sensor 340.

The processor 310 may activate the TOF sensor 340 in response to an input to measure the distance to the external subject 302, measure the distance to the external subject by using the activated TOF sensor, and store the measured distance in the memory 330.

Herein, the input to measure the distance to the external subject 302 may be an input to execute an arbitrary application (e.g., a camera application). However, the input to measure the distance to the external object 302 is not limited to the arbitrary application.

To be specific, the processor 310 may control the TOF sensor 340 to irradiate, to the external subject 302, the irradiation light 371 having a frequency determined by using a light source 350 of the TOF sensor 340, and obtain information of a distance between the image sensing device 300 and the external object 302 based on the amount of time, during which the reflected light 375 travels and is reflected from the external object 302 back to the image sensing device 300.

Also, the processor 310 may transfer the obtained distance information to a component (e.g., an application) requesting the distance information.

According to another embodiment of the present invention, when calibration data are provided for the frequency of the irradiation light 371 used to obtain the distance information, the processor 310 may not correct the distance information which is obtained based on the used frequency. According to another embodiment of the present invention, the distance information obtained based on the frequency for which calibration data are provided may represent a calibrated distance.

According to another embodiment of the present invention, when calibration data are not provided for the frequency of the irradiation light 371 which is used to obtain the distance information, the processor 310 may correct the obtained distance information based on the offset value for the used frequency. According to another embodiment of the present invention, the processor 310 may obtain the corrected distance information by applying, to the obtained distance information, the offset value for the frequency (e.g., a reference frequency) for which calibration data of the frequency of the irradiation light 371 are provided.

Herein, the offset value may be a deviation value between the distance measured, based on a predetermined frequency, with respect to the external subject 302 located at a reference distance from the image sensing device 300 and the distance measured, based on the reference frequency, with respect to the external subject 302 of the reference distance. According to another embodiment of the present invention, the offset value may be a deviation value between the time amount from when the irradiation light 371 of an arbitrary frequency is irradiated to when the reflected light 375 from the external subject 302 of the reference distance is received and the time amount from when the irradiation light 371 of the reference frequency is irradiated to when the reflected light 375 from the external subject 302 of the reference distance is received.

According to another embodiment of the present invention, an offset value based on a deviation value representing distances may be referred to as a distance-based offset value, and an offset value based on a deviation value representing the time amount may be referred to as a time-based offset value.

The memory 330 may store offset values for dual frequency.

The TOF sensor 340 may include a light source 350 and generate pixel signals according to a plurality of pixel clocks Clock A and Clock B having dual frequency, but each of the pixel clocks may have a different number of phases according to different exposure frames at the dual frequency.

The TOF sensor 340 may have the same structure as that of the TOF sensor 340 shown in FIG. 1. In other words, the TOF sensor 340 may include the phase modulation controller 110, the light source 350, and the pixel array 130.

The light source 350 may irradiate light to an external subject.

The phase modulation controller 110 may provide the light source 350 with a clock so that the light source 350 irradiates the irradiation light 371 according to a global clock G_clk and generate a plurality of pixel clocks Clock A and Clock B having dual frequency.

Herein, each of the pixel clocks Clock A and Clock B may have a different number of phases according to different exposure frames at the dual frequency. The dual frequency may have a high frequency having a relatively high frequency and a low frequency having a relatively low frequency. For example, the pixel clock Clock A may have 4 number of phases (i.e., the phases of 0, π/2, π, and 3π/2) within a single period of the pixel clock Clock A when it has the high frequency while having 2 number of phases (i.e., the phases of 0 and $\pi/2$) within the single period of the pixel clock Clock A when it has the low frequency. In this embodiment of the present invention, the high frequency may be 100 MHz or higher and the low frequency may be less than 100 MHz. In an embodiment, the low frequency may be 20 MHz.

To be specific, the phase modulation controller 110 may perform, at the high frequency, a modulation operation by which the pixel clocks Clock A and Clock B are shifted by 90 degrees to have four phases 0, $\pi/2$, $\pi$, and $3\pi/2$ within a single period of the pixel clocks Clock A and Clock B. Herein, the pixel clocks Clock A and Clock B may have opposite phases to each other.

The first pixel clock Clock A may be shifted by 90 degrees to sequentially have four phases 0, $\pi/2$, $\pi$, and $3\pi/2$ within the single period, and the second pixel clock Clock B may be shifted by 90 degrees to sequentially have four phases $\pi$, $3\pi/2$, 0, and $\pi/2$ within the single period, at the high frequency.

Also, the phase modulation controller 110 may perform, at the low frequency, a modulation operation by which the pixel clocks Clock A and Clock B are shifted by 90 degrees to have two phases 0 and $\pi/2$ within the single period. The pixel clocks Clock A and Clock B may have opposite phases to each other.

The first pixel clock Clock A may be shifted by 90 degrees to sequentially have two phases 0 and $\pi/2$ within the single period, and the second pixel clock Clock B may be shifted by 90 degrees to sequentially have two phases n and $3\pi/2$ within the single period, at the low frequency.

Subsequently, in the next period, the first pixel clock Clock A may be shifted by 90 degrees to sequentially have two phases n and $3\pi/2$, and the second pixel clock Clock B may be shifted by 90 degrees to sequentially have two phases 0 and $\pi/2$, at the low frequency. Thereafter, the above-described procedure may be repeatedly performed.

The pixel array 130 may receive reflected light from a subject and generate pixel signals according to the plurality of pixel clocks Clock A and Clock B.

Herein, $\Delta t$ shown in FIG. 3 may represent a time difference between the irradiation time of the irradiation light 371 and the reception time of the reflected light 375, as shown in FIG. 4.

Figure 5:
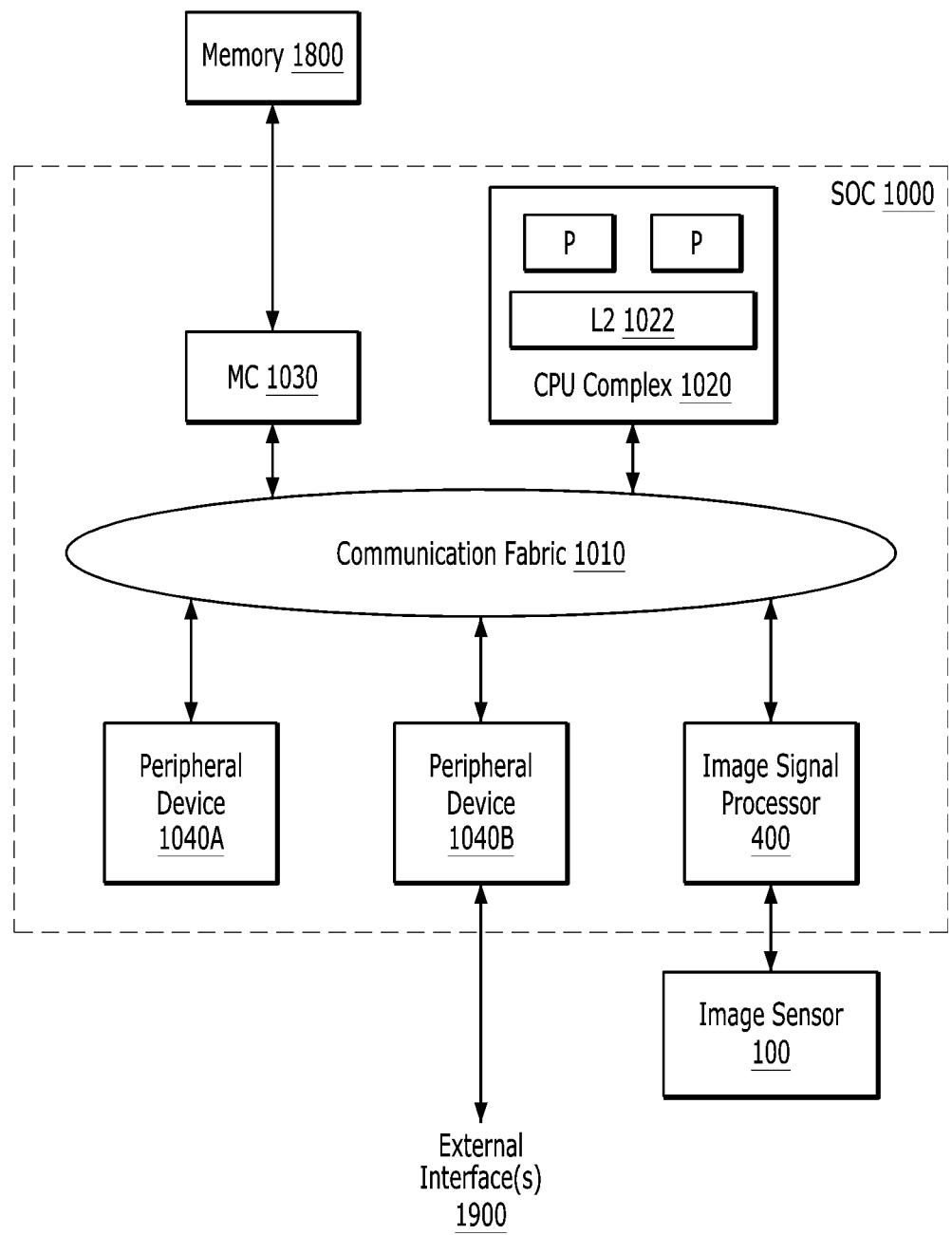
FIG. 5 is a block diagram illustrating an embodiment of a system to which the image sensing device in accordance with the embodiment of the present invention is applied.

Hereinafter, referring to FIG. 5, an embodiment of a system to which an image sensing device in accordance with an embodiment of the present invention is applied will be described. FIG. 5 is a block diagram illustrating an embodiment of a system to which an image sensing device in accordance with an embodiment of the present invention is applied.

The system illustrated in FIG. 5 may be one among a personal computer system, a desktop computer, a laptop computer, a mainframe computer system, a handheld computing device, a cellular phone, a smart phone, a mobile phone, a workstation, a network computer, a consumer device, an application server, a storage device, an intelligent display, peripheral devices such as a switch, a modem, a router, etc., and general types of computing devices, but the present invention is not limited thereto and the system illustrated in FIG. 5 may be one among diverse types of computing devices.

The system illustrated in FIG. 5 may represent a System-On-a-Chip (SOC). As the name implies, the components of an SOC 1000 may be integrated over a single semiconductor substrate, such as the integrated circuit 'chips'. According to some embodiments of the present invention, the components may be realized over two or more separate chips in a system. Herein, the SOC 1000 will be used as an example.

According to the illustrated embodiment of the present invention, the components of the SOC 1000 may include a Central Processing Unit (CPU) complex 1020, On-Chip peripheral device components 1040A and 1040B (which may be simply referred to as 'peripheral devices'), a memory controller (MC) 1030, an image signal processor 400, and a communication fabric 1010.

The SOC 1000 may also be coupled to additional components, such as a memory 1800 and an image sensor 100. All of the components 1020, 1030, 1040A and 1040B, and 400 may be coupled to the communication fabric 1010. The memory controller 1030 may be coupled to the memory 1800 while it is being used, and the peripheral device 1040B may be coupled to an external interface 1900 while being used.

In an embodiment of the present invention, the CPU complex 1020 may include one or more processors 1024 and a level-2 cache L2 1022. The peripheral devices 1040A and 1040B may be a set of additional hardware functions included in the SOC 1000. For example, the peripheral devices 1040A and 1040B may include display controllers, Graphics Processing Units (GPUs), video encoders/decoders, scalers, rotators, blenders, etc., that are formed to display video data on one or more display devices.

The image signal processor 400 may process image capture data from the image sensor 100 or another image sensor. As for the structure and operation of the image signal processor 400 and the image sensor 100, the structures and operations of the image signal processor 400 and the image sensor 100 shown in FIGS. 1 to 6 may be referred to.

The peripheral devices may also include audio peripheral devices, such as microphones, speakers, interfaces with microphones and speakers, audio processors, digital signal processors, mixers, etc. The peripheral devices may include peripheral device interface controllers (for example, a peripheral device 1040B) for diverse interfaces 1900 in the outside of the SOC 1000 including Universal Serial Bus (USB), Peripheral Component Interconnect (PCI) including PCI Express (PCIe), serial and parallel ports, and the like. The peripheral devices may further include networking peripheral devices, such as media access controllers (MACs).

The CPU complex 1020 may include one or more CPU processors 1024 serving as a CPU of the SOC 1000. The CPU of the system may include processor(s) executing a main control software of a system, e.g., an operating system. In general, software executed by the CPU during an operation may control the other components of the system to realize a predetermined function of the system. The processors 1024 may also execute other software, such as application programs. Application programs may provide a user with functions and may depend on the operating system for low-level device control. Accordingly, the processors 1024 may also be referred to as application processors.

The CPU complex 1020 may further include other hardware, such as an L2 cache 1022 and/or interfaces for other components of the system (e.g., interfaces for the communication fabric 1010).

Generally, a processor may include an arbitrary circuit and/or a microcode that is formed to execute commands defined in a command set architecture realized by the processor. Although the commands and data that are executed by processors may be generally stored in the memory 1800 in response to the execution of the commands, predetermined commands may also be defined for direct processor access to peripheral devices. The processors may include processor cores realized on an integrated circuit along with other components as a System-On-Chip (SOC 1000) or integration of other levels. The processors may further include separate microprocessors, microprocessors integrated in processor cores and/or multi-chip module implementations, processors realized as multiple integrated circuits, and the like.

The memory controller 1030 may include a circuit that generally receives memory operation commands from the other components of the SOC 1000 and accesses the memory 1800 to complete the memory operations. The memory controller 1030 may be formed to access the memory 1800 of an arbitrary type. For example, the memory 1800 may be Static Random Access Memory (SRAM), or a Synchronous Dynamic Random Access Memory (SDRAM) including a DRAM such as Double Data Rate DRAM (DDR, DDR2, DDR3, etc.). Low power/mobile versions of DDR DRAM (e.g., LPDDR, mDDR, etc.) may be supported. The memory controller 1030 may include queues for memory operations that direct (and potentially redirect) and present operations to the memory 1800. The memory controller 1030 may further include data buffers that store write data waiting to be written into the memory and read data waiting to return into the source of the memory operation.

According to some embodiments of the present invention, the memory controller 1030 may include a memory cache that stores recently accessed memory data. In the implementation of the SOC, the memory cache may reduce the power ratio in the SOC by avoiding re-accessing the data from the memory 1800 when it is expected to be accessed again soon. In some cases, the memory cache may be referred to as a system cache, such as private caches that supports only predetermined components, e.g., the L2 cache 1022 of the processors 1024. According to some embodiments of the present invention, the system cache may not have to be positioned in the inside of the memory controller 1030.

According to the embodiment of the present invention, the memory 1800 may be packaged along with the SOC 1000 in the form of a chip-on-chip or package-on-package. A multi-chip module structure of the SOC 1000 and the memory 1800 may also be used.

Thus, while protection data may be stored unencrypted in the memory 1800, the protection data may be encrypted to be exchanged between the SOC 1000 and external endpoints.

The communication fabric 1010 may be an arbitrary communication interconnect and protocol for communication among the components of the SOC 1000. The communication fabric 1010 may be based on a bus including hierarchical buses with shared bus elements, cross bar elements, and bridges. The communication fabric 1010 may also be based on packets and it may be a layer with a bridge, a cross bar, a point-to-point connection, or other interconnects.

The methods described in this specification may be realized by a computer program product, or software. According to some embodiments of the present invention, a non-transitory computer-readable storage medium may program a computer system (or other electronic devices) and may store commands that may be used to execute some or all of the techniques described herein. A computer-readable storage medium may include an arbitrary mechanism for storing information in a form (e.g., software and processing application) readable by machine (e.g., a computer). The machine-readable medium may include a magnetic storage medium (e.g., a floppy diskette); an optical storage medium (e.g., CD-ROM); a magneto-optical storage medium; a Read Only Memory (ROM); a Random Access Memory (RAM); an Erasable and programmable memory (e.g., EPROM and EEPROM); a flash memory; and other types of media appropriate for storing electricity or program commands, but the concept and spirit of the present invention are not limited thereto. In addition, the program commands may be communicated by using light, sound, or other forms of propagated signals (e.g., carrier waves, infrared signals, digital signals, etc.).

The computer system 1000 may include one or more modules, for example, a processor unit 1020 (possibly multiple processors, a single-threaded processor, a multi-threaded processor, a multi-core processor, etc.) that may exist in the program commands stored in the memory 1800 of the same computer system, or that may exist in the program commands stored in the memory of a system which is similar to or different from the computer system 1000 to operate a TOF sensor having dual frequency.

According to the embodiment of the present invention, a TOF sensor having dual frequency, an imaging sensing device, and an operation method thereof in accordance with an embodiment of the present invention may not have to shift a plurality of pixel clocks for each exposure frame, which makes it possible to reduce power consumption and increase an operation margin in other sections since the first and second pixel clocks Clock A and Clock B are shifted in every two exposures frames at the low frequency, and are shifted in every one exposure frame at the high frequency.

The effects desired to be obtained in the embodiments of the present invention are not limited to the effects mentioned above, and other effects not mentioned above may also be clearly understood by those of ordinary skill in the art to which the present invention pertains from the description below.

While the present invention has been described with respect to the specific embodiments, it will be apparent to those skilled in the art that various changes and modifications may be made without departing from the spirit and scope of the invention as defined in the following claims. Furthermore, the embodiments may be combined to form additional embodiments.

What is claimed is:

1. A Time of Flight (TOF) sensor using dual frequency, comprising:
   a light source suitable for irradiating light to an external subject;
   a phase modulation controller suitable for providing the light source with a clock so that the light source irradiates the light according to a timing of a global clock and generating a plurality of pixel clocks having dual frequency; and
   a pixel array suitable for receiving the pixel clocks and generating a pixel signal,
   wherein each of the pixel clocks has a different number of phases according to different exposure frames at the dual frequency,
   wherein the dual frequency has a high frequency and a low frequency less than the high frequency, and
   wherein the phase modulation controller is further suitable for performing, at the low frequency, a modulation operation in which the pixel clocks having a phase difference of 180 degrees to each other are shifted by 90 degrees for each of the pixel clocks to have two phases.

2. The TOF sensor of claim 1, wherein the phase modulation controller is further suitable for performing, at the high frequency, a modulation operation in which the pixel clocks are shifted by 90 degrees for each of the pixel clocks to have four phases.

3. The TOF sensor of claim 2, wherein the phase modulation controller performs, at the high frequency, the modulation operation in which a first pixel clock of the pixel clocks is shifted by 90 degrees for the first pixel clock to sequentially have phases of 0, $\pi/2$, $\pi$, and $3\pi/2$, and a second pixel clock of the pixel clocks is shifted by 90 degrees for the second pixel clock to sequentially have phases of $\pi$, $3\pi/2$, 0, and $\pi/2$.

4. The TOF sensor of claim 1, wherein the phase modulation controller performs, at the low frequency, the modulation operation in which a first pixel clock of the pixel clocks is shifted by 90 degrees for the first pixel clock to sequentially have phases of 0 and $\pi/2$ in a current period of the first pixel clock, a second pixel clock of the pixel clocks is shifted by 90 degrees for the second pixel clock to sequentially have phases of $\pi$ and $3\pi/2$ in a current period of the second pixel clock, the first pixel clock is shifted by 90 degrees for the first pixel clock to sequentially have phases of $\pi$ and $3\pi/2$ in a subsequent period of the first pixel clock, and the second pixel clock is shifted by 90 degrees for the second pixel clock to sequentially have phases of 0 and $\pi/2$ in a subsequent period of the second pixel clock.

5. The TOF sensor of claim 1, wherein the pixel clocks have opposite phases to each other.

6. The TOF sensor of claim 1, wherein the high frequency is 100 MHz or higher, and the low frequency is less than 100 MHz.

7. An image sensing device, comprising:
a Time of Flight (TOF) sensor suitable for generating a pixel signal according to a plurality of pixel clocks having dual frequency, wherein each of the pixel clocks has a different number of phases according to different exposure frames at the dual frequency;
a memory suitable for storing offset values for the dual frequency; and
a processor suitable for activating the TOF sensor in response to an input to measure a distance to an external subject, measuring the distance to the external subject by using the activated TOF sensor, and storing the measured distance in the memory,
wherein the dual frequency has a high frequency and a low frequency less than the high frequency, and
wherein the TOF is further suitable for performing, at a low frequency, a modulation operation in which the pixel clocks having a phase difference of 180 degrees to each other are shifted by 90 degrees for each of the pixel clocks to have two phases.

8. The image sensing device of claim 7, wherein the TOF sensor includes:
a light source suitable for irradiating and receiving light to and from the external subject;
a phase modulation controller suitable for providing a clock to the light source so that the light source irradiates the light according to a timing of a global clock and generating the plurality of pixel clocks having the dual frequency; and
a pixel array suitable for receiving the pixel clocks and generating pixel signals.

9. The image sensing device of claim 8, wherein the phase modulation controller is further suitable for performing, at the high frequency, a modulation operation in which the pixel clocks are shifted by 90 degrees for each of the pixel clocks to have four phases.

10. The image sensing device of claim 9, wherein the phase modulation controller performs, at the high frequency, the modulation operation in which a first pixel clock of the pixel clocks is shifted by 90 degrees for the first pixel clock to sequentially have phases of 0, $\pi/2$, $\pi$, and $3\pi/2$, and a second pixel clock of the pixel clocks is shifted by 90 degrees for the second pixel clock to sequentially have phases of $\pi$, $3\pi/2$, 0, and $\pi/2$.

11. The image sensing device of claim 7, wherein the phase modulation controller performs, at the low frequency, the modulation operation in which a first pixel clock of the pixel clocks is shifted by 90 degrees for the first pixel clock to sequentially have phases of 0 and $\pi/2$ in a current period of the first pixel clock, a second pixel clock of the pixel clocks is shifted by 90 degrees for the second pixel clock to sequentially have phases of $\pi$ and $3\pi/2$ in a current period of the second pixel clock, the first pixel clock is shifted by 90 degrees for the first pixel clock to sequentially have phases of $\pi$ and $3\pi/2$ in a subsequent period of the first pixel clock, and the second pixel clock is shifted by 90 degrees for the second pixel clock to sequentially have phases of 0 and $\pi/2$ in a subsequent period of the second pixel clock.

12. The image sensing device of claim 7, wherein the pixel clocks have opposite phases to each other.

13. The image sensing device of claim 8, wherein the high frequency is 100 MHz or higher, and the low frequency is less than 100 MHz.

14. A Time of Flight (TOF) sensor comprising:
a clock generator suitable for generating first and second clocks of which respective phases are opposite to each other; and
a pixel array suitable for generating a pixel signal, which represents a distance to an object, based on the first and second clocks,
wherein the first clock has four phases, which are shifted by 90 degrees within a period thereof at a frequency of 100 MHz or higher, and the second clock has two phases having a phase difference of 180 degrees, which are shifted by 90 degrees-within the period at a frequency under 100 MHz.

15. A Time of Flight (TOF) sensor using dual frequency, comprising:
a light source suitable for irradiating light to an external subject;
a phase modulation controller suitable for providing the light source with a clock so that the light source irradiates the light according to a timing of a global clock and generating a plurality of pixel clocks having dual frequency; and
a pixel array suitable for receiving the pixel clocks and generating a pixel signal,
wherein each of the pixel clocks has a different number of phases according to different exposure frames at the dual frequency,
wherein the dual frequency has a high frequency and a low frequency less than the high frequency, and
wherein the phase modulation controller performs, at the high frequency, a modulation operation in which a first pixel clock of the pixel clocks is shifted by 90 degrees for the first pixel clock to sequentially have phases of 0, $\pi/2$, $\pi$, and $3\pi/2$, and a second pixel clock of the pixel clocks is shifted by 90 degrees for the second pixel clock to sequentially have phases of $\pi$, $3\pi/2$, 0, and $\pi/2$.

* * * * *